July 6, 1965
F. J. BERNARD
3,193,634
CONNECTOR FOR DISPLAY STRUCTURES AND THE LIKE
Filed July 17, 1961
2 Sheets-Sheet 1
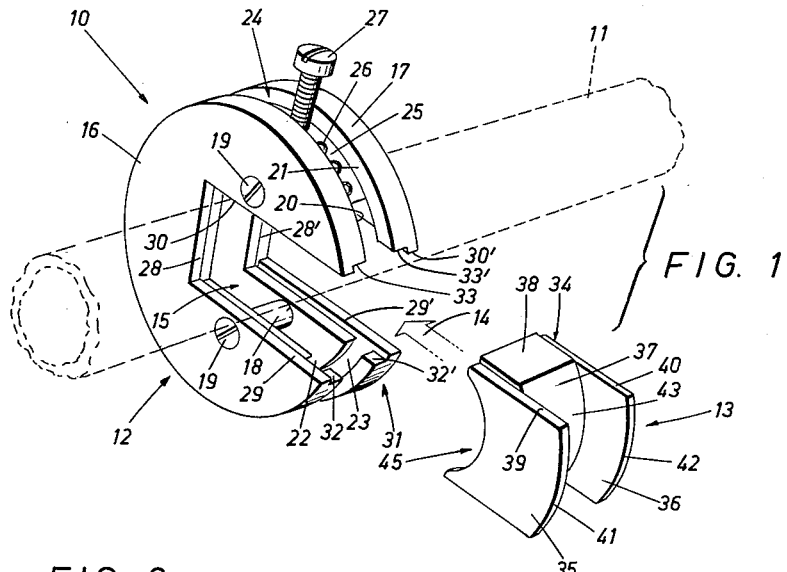
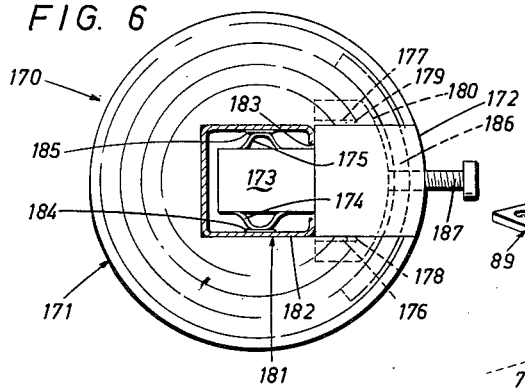
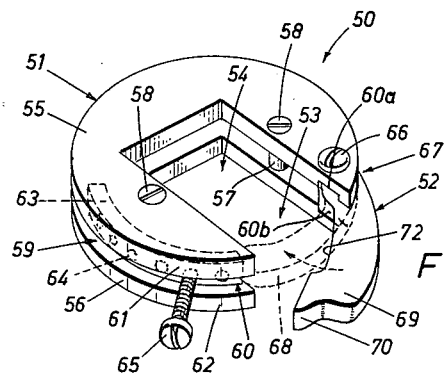
Inventor
FRANK J. BERNARD
by: Douglas J. Johnson
Attorney July 6, 1965     F. J. BERNARD     3,193,634
CONNECTOR FOR DISPLAY STRUCTURES AND THE LIKE
Filed July 17, 1961     2 Sheets-Sheet 2
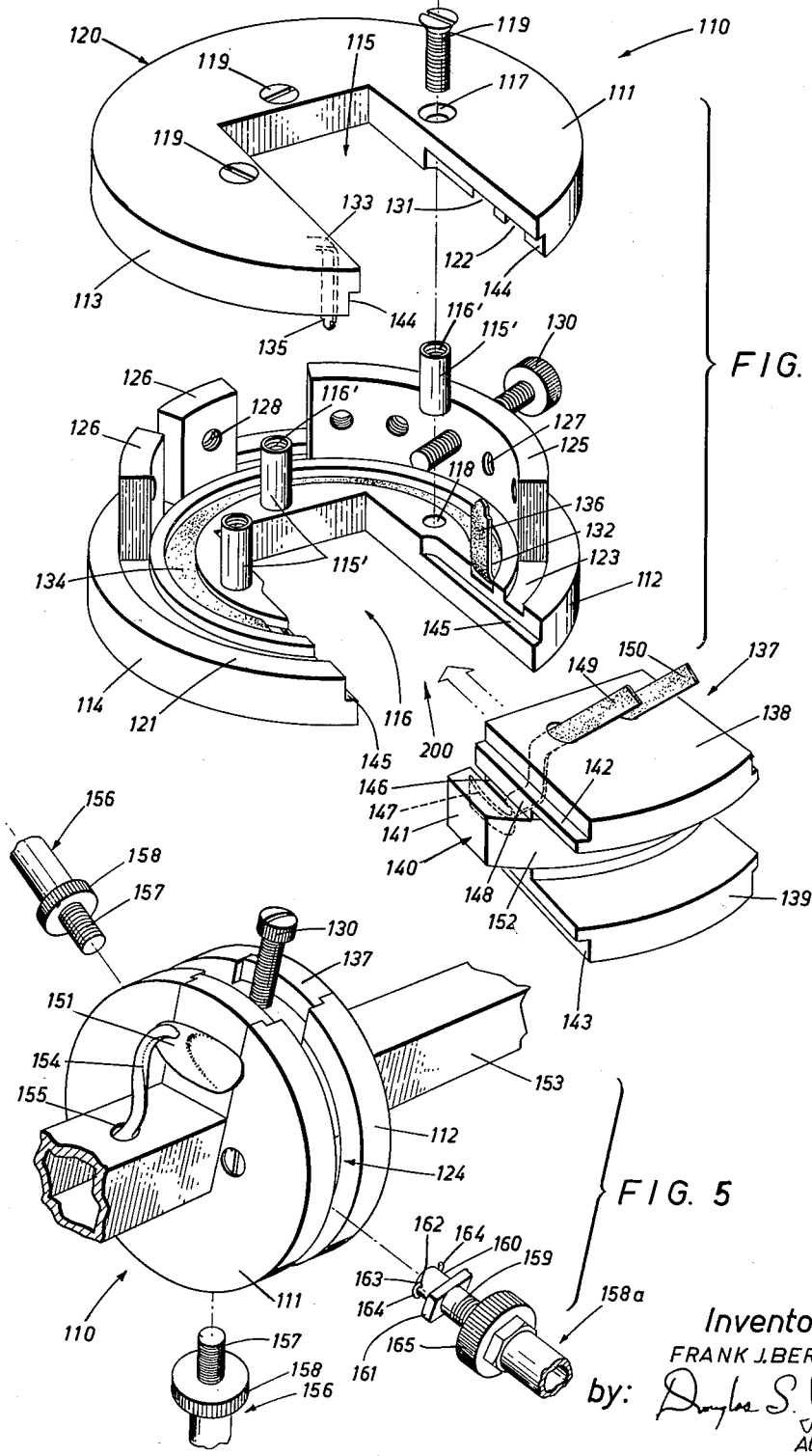
Inventor
FRANK J. BERNARD
by: Douglas S. Johnson
Attorney United States Patent Office 3,193,634
Patented July 6, 1965

3,193,634
CONNECTOR FOR DISPLAY STRUCTURES
AND THE LIKE
Frank J. Bernard, 200 Geary Ave.,
Toronto, Ontario, Canada
Filed July 17, 1961, Ser. No. 124,593
9 Claims. (Cl. 200—51)

This invention relates to improvements in a connector for display structures, scaffolding, furniture, or any other knock-down framework made up of connectors and structural members and pieces.

This invention has for its object a connector for joining together of structural members in the assembly of framework for supporting articles for display purposes, scaffolding for supporting panels, for enclosures or in any circumstance where any support framework is required which can be of a permanent nature, but especially those which are to be taken apart again.

In my U.S. Patent No. 2,874,984 granted February 24, 1959, there is described and claimed a connector which is useful for the same purposes. This invention relates to an improved connector which has the advantage that it can be applied to an existing structure without dismantling or changing the relationship of the components thereof.

More particularly, it is an object of this invention to provide a connector which can be applied to a structural member already in position and an integral part of an existing structure and be securely affixed to it at a selected position over its length to form a means of attachment to rigidly support or connect other panels, structural elements, shelves or the like or to provide a tie for other assembled framework.

Another important object is to provide a detachable connector which carries electrical conductors in a manner which conceals both the connections and the conductors for purposes of appearance.

Still another object is to provide electrically wired structural elements which are adapted to co-operate with the electrically wired connectors over the range of positions available for illumination or for lighting effects or other purposes.

Still another object is to provide a connector which is capable of supporting elements in different angular positions and which is adjustable over an infinite range of positions on a structural member so that any desired relationship of the components can be achieved.

Another object is to provide a connector which can be applied to structural members of different cross sections yet can be rigidly secured thereto.

The principal feature of this invention resides in providing a connector of ring-like configuration of which a portion is detachable or movable in relation to the other so that the central opening is accessible through the position occupied by the detachable or movable portion enabling one to place a structural element within the central opening while the ring is open and then to close the opening with the detachable or movable portion to complete the ring and to clamp the structural element therewithin.

Another feature resides in providing both the major portion of the ring-like structure and the detachable or movable portion with guideways spaced from the peripheries and which open to the periphery of the connector to provide guiding and supporting surfaces throughout its peripheral extent for the purposes of effecting the desired connections between the connector and other elements.

More particularly, the connector of this invention is provided with internal guideways or runways in which an element or elements of a releasable clamp device are deposited in sliding fit, the connector having passageways or slots opening to its periphery to receive the other component or components of the clamp device for co-operation with the first-mentioned elements to secure structural pieces thereto at the periphery. This aspect is similar to the arrangement illustrated in my U.S. Patent No. 2,874,984.

Still another feature resides in providing the major portion and the detachable or removable portions with interengageable electrical contacts and to use the detachable or removable portion as a switch or electrical connector so that power will be available throughout the ring if it is required, and over the range of positions available on the structural element.

More particularly, a feature of this invention resides in utilizing a structural element to carry electrical leads, the detachable portion of the connector having contacts which are adapted to engage the electrical leads in any selected position over the extent of the structural element to bring power to the connector over the range of adjustment.

Another feature resides in providing a connector whose major and minor portions are releasably secured together with the clamp components normally used to attach other pieces to the periphery of the connector.

These and other objects and features are described in the following specification to be read in conjunction with the sheets of drawings in which:

FIGURE 1 is a perspective view of a connector constructed in accordance with this invention and depicts its application to a structural element in broken outline;

FIGURE 2 is a perspective view of a different embodiment of a connector constructed in accordance with the invention;

FIGURE 3 is a perspective view of still another embodiment of the invention;

FIGURE 4 is an exploded view in perspective of a connector similar to the connector of FIGURE 1 but which is provided with electrical conductors;

FIGURE 5 is a perspective view of the connector of FIGURE 4 fully assembled and secured to a structural member, and also illustrating certain embodiments of structural pieces, including electrically wired elements, which are adapted for attachment thereto;

FIGURE 6 is still another embodiment of an electrically wired connector in plan view, which is adapted to establish contact with electrical conductors carried by the structural element to which it is attached.

In FIGURE 1 of the drawings the connector 10 is illustrated embodying the features of this invention and is shown in partly assembled relation as it is applied to a structural element 11 in broken outline. The connector 10 is in the form of two parts, a major portion indicated at 12 and a minor portion indicated at 13 which fit together in the manner indicated by the arrow 14 to form a ring-like structure having a central opening 15 therethrough for the reception of the structural member 11.

The major portion 12 of the connector 10 consists essentially of two C-shaped plates 16 and 17 of like peripheral configuration and extent, the plates 16 and 17 being secured together in spaced parallel relation by tubular internally threaded sleeve members 18 of like extent which register with openings in the plates 16, 17 and through which threaded fasteners 19 extend to engage the sleeve members 18 from either end.

The opposing surfaces 20 and 21 of the plates 16, 17 respectively, are provided with groove formations 22, 23 respectively, of like configuration and extent, the grooves 22, 23 having a configuration following the circular periphery of their respective plate elements 16, 17.

As the grooves 22, 23 are recessed into the surfaces 20, 21 of the plates 16, 17 it is appreciated that the guideway so defined by the grooves 22, 23 opens to the periphery of the major portion 12 through a reduced throat indicated generally at 24.

Mounted in sliding fit within the internal guideway formation defined by grooves 22, 23 is a curvate clamp element 25 having a plurality of threaded openings 26 therethrough which is adapted to co-operate with a threaded stud or fastener element 27 to clamp structural pieces to the periphery of the connector 10.

In this embodiment the element 25, as already stated, has a curvate configuration which follows the configuration of the guideway and therefore is slidable therein over the extent of the guideway. It is also to be appreciated that nut elements, square-sided, can be mounted in the guideway for displacement therealong for anchoring structural pieces to the periphery in co-operation with a threaded stud or fastener similar to fastener 27.

The central opening 15 in the major portion 12 is bounded by edge portions which are linear as at 28, 28′, 29, 29′ and 30, 30′ respectively. Edge portions 29, 29′, 30, 30′ are parallel and intersect with the outer peripheries of the plate elements 16, 17 to define an access opening 31 which merges with the central opening 15 of the major portion 12 of connector 10.

The edges 29, 30 and 29′, 30′ are recessed as at 32, 32′, 33, 33′ to define a guideway for the reception of co-operating and registering portions 34 of the minor portion or insert 13 of the connector 10.

It is seen in FIGURE 1 that the minor portion 13 consists essentially of two plate members 35, 36 secured together by an intermediate block portion 37, the ends 38 of the block 37 being elevated with respect to the edges 39, 40 of the plates 35, 36 to define the guiding and registering formation 34 for co-operation with the grooves 32, 32′, 33, 33′ of the edges 29, 29′, 30, 30′ respectively.

The plates 35, 36 have curvate outer edges 41, 42 corresponding to the curvature of the outer periphery of the plate members 16, 17 respectively and, as well, the block 37 has an outwardly facing surface 43 whose radius of curvature corresponds to the radius of curvature of the periphery of the plates 16, 17. It is to be appreciated that the surface 43 is spaced from the edges 41, 42 of the plates 35, 36 a distance corresponding to the spacing of the inner walls of the grooves 22, 23 so that when the minor portion 13 is inserted into the passage 31 the surface 43 defines an extension of the guideway defined by the grooves 22, 23.

It will be appreciated that the element 25 with the fastener 27 can be moved to bridge the juncture of the block 37 with the major portion 12 of the connector when the insert 13 is in full registration within the access opening 31 and so secure the insert 13 and the major portion 12 together against separation.

It is also to be observed that the plates 35, 36 have part circular edges facing inwardly as at 45 which together with the edges 28, 28′, 29, 29′ and 30, 30′ define a closed central opening in the connector 10 for the reception of the structural element 11.

Because of the curvate configuration of the edges 45 a tubular structural element having a circular configuration in cross-section can be anchored within the central opening and be clamped against relative displacement and also it will be appreciated because of the rectilinear outline of the remaining extent of the edge portions of the opening 15, a channel member or tubular member having a rectilinear configuration in cross-section can also be fixedly secured therein.

It is to be understood that the stud 27 in threading through an opening 26 in the clamping element 25 will abut against the surface 43 and will urge the minor portion 13 against the contained structural element 11 with the clamping element bearing against the outer walls of the registering grooves 22, 23.

In FIGURE 2 of the drawings a different embodiment of the connector constructed in accordance with the invention is illustrated at 50. The connector 50 consists of a major portion 51 and a pivotally connected minor portion indicated at 52 which is adapted to open and close the passage 53 in the major portion 51 leading from the periphery of the connector 50 to the central locating opening 54 for the reception of a structural element.

The major portion 50, as in the case of the connector of FIGURE 1, consists of upper and lower plates 55, 56 mounted in overlying registration to one another and secured and uniformly spaced from each other by means of sleeve elements 57 and fasteners 58 to define a peripherally extending reduced throat formation 59 leading to an internal guideway formation 60 defined by grooves 60a, 60b formed in the opposing faces 61, 62 of plates 55, 56 in a like manner as in the embodiment of FIGURE 1.

Mounted to slide in the guideway formation 60 is a nut-like component 63 of a clamp device having a curvate configuration following the configuration of the guideway 60 and being provided with a plurality of threaded openings therethrough as at 64 to receive a threaded shank of a suitable stud or fastener 65 to secure structural pieces to the periphery of the connector 50.

The minor portion 52 of the connector 50 is pivotally or hingedly connected by a fastener 66 within the reduced throat 59 of the spaced plates 55, 56 as at 67 and is swingable from a position in which the access opening 53 is fully open to the dotted line position 68 of FIGURE 2, the end 69 of the element 52 being provided with a projection 70 which is adapted to be located behind the guideway formation 60 and to be engaged by the clamping component 63 which engages over the projection 70 preventing the element 52 from being dislodged and so securing the element 52 against separation from the major portion 51 of the connector 50.

The inner edge of the element 52 is contoured as at 71 to provide an abutting surface of the desired configuration for a structural element to be placed within the central opening 54.

In FIGURE 3 still another embodiment of a connector 75 constructed in accordance with the invention is illustrated. The major portion 76 has an outer rectilinear configuration and consists of overlying registering C-shaped plates 77, 78 secured together in spaced parallel relation by spacer blocks 79, the inner surfaces 80, 81 being provided with a plurality of opposed paired grooves 82, 83, 84, 85, 86, 87 respectively, which pairs of grooves follow the outer peripheries next adjacent to define a plurality of internal guideways opening to the peripheries through reduced throats in a like manner as in the embodiments of FIGURES 1 and 2.

It is seen in FIGURE 3 that the internal guideways defined by the pairs of grooves 82, 83, 84, 85, 86, 87 respectively, are linear and open at each end to the periphery of the connector 75 and are adapted to receive elongated bar elements 88 and 89 having threaded openings 90, 91 respectively, therein for the reception of the threaded shank of a suitable fastener or fasteners having the form indicated at 92.

The minor portion or insert 93 for closing the access passage 94 leading from the periphery to the central opening 95 consists of a pair of overlying plates 96, 97 spaced apart in parallel relation and secured together by means of a block 98, the inner surfaces of the plates 96, 97 projecting outwardly beyond the block to define a guideway opening 99 to the periphery of the insert 93.

The ends of the C-shaped major portion 76 are transversely grooved as at 102, 103; 104, 105; and are arranged in alignment and are adapted to register with the guideway 99 of the insert 93.

It will thus be appreciated that the bar element 89 will register with the aforementioned guideway 99 and together with associated fastener 92 will lock the insert 93 within the passage 94 to the major portion 76 of the connector 75, and as well fastener 92 will urge the insert 93 against the abutting surface of the contained element.

The opposing walls of the passage 94 are recessed as at 106 and 107 respectively, to register with the correspondingly configured ends 108 and 109 of the insert 93 which keying arrangement together with the bar 89 ensures that the insert 93 will be securely affixed to the major portion of the connector 76.

It will be appreciated that in a manner similar to that of the embodiment of FIGURES 1 and 2 a structural member, indicated in broken outline at 100, can be placed in the central opening 95 through the access passage 94 and be clamped in position by the insert 93 and bar 89 and fastener 92, the connector 75 subsequently having other structural pieces secured to its periphery employing other apertured bar elements and nut elements with suitable fasteners.

In FIGURES 4 and 5 of the drawings an electrically wired connector is illustrated at 110 and includes a major portion consisting of overlying plates 111 and 112 of like configuration and extent, the plates 111 and 112 having part circular peripheral portions 113, 114 and a recess 115, 116 respectively, bounded by rectilinear edges.

In like manner as the connector 10 of FIGURE 1, the plates 111, 112 are fastened together in spaced parallel relation by spacers in the form of tubular sleeve elements 115′ internally threaded as at 116′ and regintering with openings 117, 118 in the plates 111, 112 respectively, and being adapted to be threadably engaged at each end with fasteners 119 extending through the openings 117, 118 from the upper and lower surfaces of the plates 111 and 112 respectively.

The inner opposed spaced surfaces 120, 121 of the plates 111, 112 are each provided with groove formations 122, 123 respectively, of like configuration and extent and following the part circular periphery of the plate elements 111, 112 to define an internal guideway formation opening to the periphery of the assembled connector 110.

As will be appreciated from FIGURE 4, a plurality of clamping elements 125, 126 are deposited in the guideway defined by the opposed grooves 122, 123 and are in sliding fit therein, the elements 125 and 126 being provided with threaded openings 127 and 128 respectively, to receive the threaded shanks of fasteners 130 or other similar fastener means for the securing of structural pieces to the periphery of the connector 110.

A second groove formation 131 is formed in the surface 120 of the plate 111 inwardly of the groove 122 and likewise in the surface 121 of the plate element 111 a groove 132 is formed inwardly of groove 123.

Grooves 131 and 132 are arranged in overlying registration and have a configuration following the configuration of grooves 122 and 123 respectively.

Mounted within each of the groove formations 131 and 132 are flat-lying part circular conductor elements 133 and 134 respectively, each providing a surface for electrical contact throughout their extent and each having an upstanding terminal portion 135 and 136 respectively, which are arranged to extend generally oppositely axially of the connector 110 at the juncture of the grooves 131 and 132 with the edges of the passage 200 defined by recesses 115, 116.

The insert for completing the ring indicated at 137 comprises a pair of spaced overlying plate members 138, 139 of opposite symmetry joined together by an intermediate block 140 whose end portions 141 extend beyond the side edges 142 and 143 of the plates 138 and 139 in a manner similar to the insert 13 of FIGURE 1 the edge portions 141 having an extent to fit within reduced throat portions of the major portion of connector 110 at opposite sides of the passage 200 and the edges 142 and 143 of the insert 137 being contoured to register with the groove formations 144 and 145 respectively, of the plate elements 111 and 112 along the edges of the access passage 200.

The ends 141 of the block 140 are provided with a recess or slot 146 in which a U-shaped electrical spring contact 147 is located, the contact 147 having a lead portion 148 connecting contact 147 to a terminal 149.

The slot 146 on the opposite side of the insert 137, not illustrated, is likewise provided with a U-shaped electrical spring contact and a lead which connects the U-shaped contact with a second terminal 150, terminals 149, 150 adapted to be inserted in the plug element 151 to supply electricity to the conductors 133 and 134 of the connector 110 from a source of power.

Upon insertion of the member 137 in the direction of the arrow to close the passage 200 the U-shaped contacts 147 embrace the upstanding terminal portions 135, 136 of the conductors 133, 134 respectively, to establish an electrical connection. The curvate surface 152 of the block 140 as well registers with the rearward wall of the internal guideway defined by grooves 122, 123, for the reception of the curvate clamp element 125 which bridges the juncture of the insert 137 and the major portion of the connector 110 so that the insert 137 is clamped thereto against separation in a manner similar to that described in connection with the connector 10 of FIGURE 1.

With reference to FIGURE 5, it is seen that the connector 110 is mounted upon a structural element 153 having a hollow profile, the hollow profile being utilized to pass a suitable conductor from one end thereof to an intermediate position, the conductor indicated at 154 passing through an aperture 155 in the wall of the structural element 153 and being provided with the terminal plug element 151 to establish electrical communication between the conductors 133 and 134 of the connector 110 and a source of power.

In FIGURE 5 there is illustrated structural pieces 156 which are provided with a threaded shaft portion 157 at one end to threadably engage in the apertures 128 of the nut elements 126 located in the internal guideway of the connector 110 to secure the pieces 156 at the periphery of the connector 110. Mounted for rotation on threaded shaft portions 157 are lock nut elements 158 which are manipulated to bear against the periphery of connector 110, with the shafts 157 engaging in the nut elements 126, whereby said structural pieces are securely fastened to the connector 110 against dislodgement.

In FIGURE 5 a structural element indicated at 158a is provided for supporting an electrical device, for example a bulb socket or an electric motor, the structural piece 158a having likewise a threaded shaft portion 159 at one end, the threaded shaft portion terminating in an insulated tip portion 160 and having a square-sided nut element 161 secured thereto and spaced from insulated tip or end 160. The tip 160 is provided with openings 162 therethrough through which the ends 163, 164 of the pair of conductors extend on opposite sides of the end portion 160. It is to be appreciated that the nut element 161 and the openings 162 are spaced apart a distance corresponding to the spacing of the paired grooves 122, 123, and 131, 132, respectively.

The nut element 161 has a dimension in one direction corresponding to the separation of the plates 111 and 112 and in the other direction a dimension corresponding to the separation of the bottoms of the groove formations 122, 123.

It will be appreciated that with the narrower dimension of the nut element 161 presented to a reduced throat 124 of the connector 110, it will pass therethrough and upon turning of the structural piece 158 with the nut element 161 registering with the grooves 122, 123 the nut element 161 engages therewithin and, as well, the ends 163, 164 of the conductors are brought into electrical contact with the conductors 133, 134 mounted within the grooves 131, 132 of plates 111, 112 respectively.

A clamping nut 165 is threadably mounted as well on the threaded shaft portion 159 and is adapted to be manipulated to bear against the peripheries of the plates 111, 112 which results in the urging of the nut element 161 against the outer walls of the grooves 122, 123 to anchor the structural piece 158 securely thereto.

It is to be appreciated that the structural element 153 has a hollow profile which can be used to conceal the conductor supplying power to a bulb socket or motor to be mounted upon the element.

In FIGURE 6 a connector similar to that illustrated in FIGURES 4 and 5 is illustrated. The connector indicated at 170 consists of a major portion 171 and an insert 172, the major portion 171 being substantially identical with that of connector 110 in FIGURES 4 and 5 and the insert 172 having a like structure as insert 137 except as follows.

Insert 172 is provided with an extension 173 which is adapted to project into the central opening 182 of the major portion 170 to present spring terminal portions 174 and 175 respectively for electrical contact at opposite sides thereof. Electrical conductors or leads, not illustrated, from terminal portions 174, 175 are taken through the insert 172 and are connected to U-shaped spring terminal portions 176 and 177 in slots 178 and 179 at opposite sides of the connecting block 180 of the insert 172 in a manner similar to that of insert 137 in FIGURES 4 and 5 to provide electrical power for the internal conductors of the connector 170.

In this instance it is to be observed that a channel member 181 is received within the central opening 182 of the connector, the connector 170 being arranged in relation to the channel 181 so that the projection 173 of the insert 172 passes through the open side 183 of the channel 181 and is received therewithin, the channel 181 being provided with suitably insulated longitudinally extending conductor elements 184, 185 respectively on opposed inner surfaces, against which the spring terminal portions 174, 175 are adapted to abut to establish electrical contact therebetween.

In this arrangement it will be appreciated that the insert 172 will first be positioned with respect to the channel 181 with the projection 173 located within the hollow profile of the channel 181.

It is to be understood that the projection 173 will have a dimension taken in a direction perpendicular to the plan view illustrated in FIGURE 6 which is no greater than the separation of the edges of the channel 181 defining the open side 183 so that when turned at right angles from the position shown in FIGURE 6 the insert 172 with projection 173 can be passed through the opening 183 and then turned to establish the electrical contact illustrated.

The major portion 171 of the connector 170 then can be applied around the channel 181 and the major portion 171 and the insert 172 connected together by the part circular plate element 186 and threaded fastener 187 in a manner identical with that of the connector 110 illustrated in FIGURES 4 and 5.

In all instances where the connectors are provided with electrical conductors the electrical conductors are suitably insulated from short circuiting where the connector might be of metal and in certain embodiments the connectors can be made of non-conducting material, for example, plastic which in itself serves as the insulating medium.

The preferred embodiments of the invention have been described and illustrated in detail whereas persons skilled in the art may make modifications or variations in the structures without departing from the spirit and the scope of the invention as defined in the appended claims.

What I claim is:

1. In a connector for joining structural elements together, the combination of a body having an internal trackway formation opening throughout its extent to the periphery of the body through a reduced throat formation, electrical conductor means mounted within and extending along said internal trackway and presenting opposed surfaces of contact therealong, support means insertable in a first determined position through said reduced throat formation, said support means carrying second electrical conductor means having contact terminal portions upstanding therefrom at opposite sides, said terminal portions being arranged upon insertion of said support means within said reduced throat formation to register with said internal trackway and upon turning movement being imparted to said support means to move same to a second determined position to make contact respectively with the opposed surfaces of said first electrical conductor means, and means for securing said support means to said body in said second determined position.

2. A connector according to claim 1 in which said body has a first internal trackway opening throughout its extent to the periphery of the body through a first reduced throat formation, and a second internal trackway spaced inwardly of and following said first internal trackway and opening throughout its extent to said first internal trackway through a second reduced throat formation, said second internal trackway formation having said electrical conductor means mounted therein, and said support means carrying opposed projection means in spaced relation to said terminal portions of said second electrical conductor means and having an extent and configuration to pass through said first reduced throat formation with said support means located in said first determined position and to register within said first internal trackway formation upon turning movement being imparted to said support means to move same to said second determined position.

3. A connector according to claim 2 in which said support means is constituted by a rigid support element having a hollow profile with said second electrical conductor means mounted to extend therewithin.

4. A connector according to claim 3 in which said rigid support element is provided with a threaded clamping nut formation in spaced relation to said projections, and displaceable axially thereof, said threaded clamping nut formation being adapted to bear against the periphery of said body with said projections registered within said first internal trackway formation and with said electrical terminal portions arranged in contact with the surfaces of said first electrical conductor means located in said second internal trackway formation.

5. A connector according to claim 1 in which said body is in the form of at least two relatively separable mating components arranged to define a ring-like body in one position and to present an access passage leading from the periphery of the ring-like body so defined to the central opening thereof in a second position, means for securing said mating components together to define said ring-like body and means for releasably attaching said ring-like body to a structural element adapted to be located within said central opening.

6. A connector according to claim 5 in which one of said mating components is in the form of a C-shaped body part and the other of said mating components is in the form of a closure member having a configuration and extent to register with and bridge the access passage defined by the spaced arms of said C-shaped body part.

7. A connector according to claim 6 in which said C-shaped body part is formed with said first and second internal trackway formations and reduced throat formations respectively, and said first electrical conductor means are each provided with a terminal portion projecting into the access passage presented by said C-shaped body part, said closure member is provided with spaced interengageable terminal portions adapted to contact said terminal portions of said first electrical conductor means respectively upon disposition of said closure member within said access passage to form said ring-like body, said interengageable terminal portions carried by said closure member being provided with electrical leads for connection to a source of electricity.

8. A connector according to claim 7 in which said electrical leads terminate in upstanding terminal portions on said closure member and are adapted for reception within a plug element.

9. A connector according to claim 7 in which said closure member is provided with a projection adapted to extend into the central opening of the ring-like body so defined, with said electrical leads terminating in electrical contact elements located at opposite sides of said projection, and a structural member of channel shape adapted to be located within said central opening with its open side facing said closure member and with the open side having a dimension to receive therewithin said projection and associated electrical contact elements, said structural channel member having electrical conductor elements extending longitudinally thereof and in opposition therewithin and arranged to establish electrical contact respectively with the electrical contact elements carried by said projection.

References Cited by the Examiner
UNITED STATES PATENTS

| | | | |
|---|---|---|---|
| 496,185 | 4/93 | Bowling | 211—107 |
| 509,129 | 11/93 | Johnson | 287—111 |
| 804,387 | 11/05 | Davis | 287—111 |
| 948,041 | 2/10 | Buckton | 200—51 |
| 1,757,177 | 5/30 | Eichner | 200—51 |
| 2,874,984 | 2/59 | Bernard | 287—14 |
| 3,003,646 | 10/61 | Wolf | 211—107 |

FOREIGN PATENTS 39,421  10/86  Germany.

BERNARD A. GILHEANY, *Primary Examiner.*